Patented Dec. 29, 1931

1,838,109

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

PRODUCTION OF FURFURAL

No Drawing.    Application filed June 6, 1930. Serial No. 459,610.

This invention relates to the production of furfural in a condition such that it is suitable for various uses, including the manufacture of condensation products and synthetic resins. It is more particularly concerned with the production of furfural as a by-product in the manufacture of chemical wood pulps which are liberated by digestion in acid cooking liquors, such, for example, as acid sulphite liquors.

I have observed that when wood is digested more especially in acid cooking liquors, for the production of pulp, the pentosans present in the raw wood undergo hydrolysis successively into pentoses, which are unfermentable reducing sugars, and then into furfural. In other words, in addition to the main fiber liberating reaction, there is reaction to form pentoses and furfural, analogous to that relied upon when a raw material high in pentosans, such as oats, is caused to undergo acid hydrolysis to form furfural.

In accordance with the present invention, I recover furfural from spent or residual cooking liquors, preferably of acid character, by subjecting such liquors in acid condition to sufficiently high temperatures to effect a vaporization of the furfural, whereupon the vaporized furfural is condensed along with the steam associated therewith and the furfural is steam-distilled or fractionated from the mixed condensate. The principles of the present invention, while applicable to various kinds of spent acid cooking liquors, are especially useful in their application to spent acid sulphite liquors resulting from the liberation of hardwood pulps. The hardwoods, including birch, maple, beech, and the like, are especially high in their pentosan content, which may amount to as high as 20% to 22%, based on the weight of dry wood. Their cooking under fiber-liberating conditions in acid sulphite liquors gives rise to spent liquors containing furfural in such amounts that its recovery from the spent liquor as hereinbefore described is economically warranted.

While various procedures falling within the purview of the present invention are possible, I shall hereafter give a typical procedure which may be followed with eminently satisfactory results. A suitable hardwood, such as birch, is cut into chips such as used in chemical pulpmaking operations, and the chips are charged into the usual type of acid digester along with an acid sulphite cooking liquor of any suitable composition. For example, the cooking liquor may comprise a calcium base, in which case it may contain about 1% combined $SO_2$ and about 5% or more free $SO_2$. If desired, however, the cooking liquor may be a solution of sulphurous acid, or of sodium bisulphite, or a sulphurous acid solution of sodium sulphate and/or sodium acid sulphate, or a mixture of sodium bisulphite and calcium bisulphite. When sodium base chemicals are used, the cooking liquor may contain as high as 4%, or even a greater proportion, of combined $SO_2$, and the free $SO_2$ may be present in the liquor in amount equal to or in excess of the combined $SO_2$. In any event, however, the liquor is one which is distinctly acid, as it is the acid constituent of the liquor which brings about the hydrolysis of the pentosan content of the wood during the cooking operation into furfural. The digester contents are heated while confined in the digester to temperatures capable of effecting fiber liberation, the particular temperature of cooking employed depending upon the composition of the liquor. For example, if the liquor is one containing 1% to 2% combined $SO_2$ and 5% or more free $SO_2$, cooking should be effected at temperatures of from 250° to 275° F., at which temperatures fiber liberation is effected in from six to eight hours; but if the liquor is one which is high in its content of combined $SO_2$ and contains free $SO_2$ in amount equal to or not much in excess of the combined $SO_2$ content, cooking may be effected at somewhat elevated temperatures, say, 275° to 300° F., at which temperatures fiber liberation is also effected in from four to six hours. The characteristics and composition of the resulting pulp will vary with the composition of the cooking liquor, but, inasmuch as the present invention lies in the treatment of the spent liquor, a description of the various types of pulp produced by cooking in acid sulphite liquors of various compositions is unnecessary. The use of an acid sulphite liquor in which the free $SO_2$ is present in amount exceeding the combined $SO_2$ necessitates the release of such excess free $SO_2$ during the last stages of cooking, as is customary practice. I have found that if the so-called relief gas is cooled to condense the vapors present therein, the resulting condensate contains a substantial proportion of furfural. The condensate thus obtained may, therefore, be advantageously mixed with the furfural-containing condensate recovered from the spent liquor as hereinafter described.

The spent liquor resulting from cooking as hereinbefore described may contain a high proportion of pentoses rather than furfural, particularly if the temperature of cooking has been insufficiently high to effect a hydrolysis of the pentoses into furfural. The presence of pentoses in considerable amount in the spent liquor is especially true in the case of hardwoods which have a pentosan content of about 20%. In such case, the pulp obtained by cooking in a usual bisulphite liquor has a pentosan content of about 3% to 7%, and the pulp yield is about 50%, based on the weight of the dry wood. About 75% of the pentosans present in the raw wood thus do not appear in the pulp, but are dissolved in the liquor. Analyses of the liquor shows that most of these dissolved pentosans appear as pentoses or as furfural in the liquor, but most of the furfural escapes with the gases relieved from the digester during the cooking operation. The acid content of the liquor is, however, sufficient to cause the hydrolysis of the pentoses into furfural, if the spent liquor is subjected to suitably high temperatures for a sufficient period of time. To this end, rather than blowing the digester according to the customary practice before separating the pulp from the spent liquor, the spent liquor may be trapped off while still under pressure and at the elevated temperature of cooking into a container in which it may be heated to convert its content of pentoses into furfural. This conversion may be effected by maintaining the liquor at temperatures of from 250° to 400° F. for a sufficient period of time, at which temperature decomposition of the furfural produced is not excessive, if the acid content of the liquor is not high. A complete treatment of the liquor at the lower end of the temperature range given requires more time that one effected at the higher end of the range, but higher yields of furfural are realized, owing to the tendency of this material to decompose at the higher temperature, particularly in the presence of acid. While the spent liquor is being maintained at such temperature, the vapors generated, including steam and furfural, may be allowed to escape intermittently or continuously from the vapor space above the liquor, and the vapors condensed. If the vapors generated contain sulphur dioxide, such gas may be reintroduced into the liquor to maintain a given acidity therein during the treatment. By properly carrying out this operation, at the end of three to five hours much of the furfural generated in the spent liquor is recovered in the form of a mixed water-furfural condensate. This condensate may be mixed with that obtained from the digester relief gas, as hereinbefore described, and the mixture steam-distilled or fractionated for the recovery of the furfural. A procedure such as described may be practised with a yield of furfural of about 60%, based on the original pentosan content of the wood.

When sodium base compounds are exclusively employed in the acid sulphite cooking liquor, so that it is possible to subject the resulting spent liquor to concentration without the precipitation of inorganic chemical, the spent cooking liquor may be concentrated by evaporation to, say, one-fifth of its original volume prior to being heated for the conversion of its content of pentoses to furfural. Inasmuch as it is advantageous to effect concentration in multiple-effect evaporators, which are not acid-proof, it may be desirable to neutralize the acid liquor prior to concentration, in which case the concentrated spent liquor should be treated with an acid, say, 1% sulphuric acid, based on the volume of concentrated liquor, in order to make possible the conversion of the pentoses into furfural. The heating of the concentrated spent liquor to effect the generation of furfural and the distillation of the furfural along with water therefrom results in a further concentration of the liquor. This further concentration is of value when the sodium compounds are to be recovered from the residual liquor by subjecting it to calcining and/or smelting operations. The addition of suitable acid, such as sulphuric, to the spent liquor may also be effected for the purpose of promoting hydrolysis of the pentoses into furfural in instances when the spent liquor is subjected to treatment for the recovery of furfural without having undergone neutralization or concentration. The use of sulphuric or sulphurous acids for this purpose is preferred in cases where sodium base liquors have been employed, in that these acids do not interfere with the subsequent recovery of the sodium compounds from the spent liquor as a smelt of sodium compounds capable of being reused for the preparation of a fresh cooking liquor.

The process of the present invention is applicable to other than spent bisulphite cooking liquors, for instance to spent liquors resulting from cooking wood in solutions of sulphurous acid, sulphuric acid, nitric acid, phosphoric acid, or even in water alone. Such cooking, which may constitute only one of two or more cooking operations designed to liberate the fiber, causes a marked removal of pentosans from the wood, even in the case of cooking in water alone at high temperatures; and the pentosans appear in the spent liquor as pentoses, although a certain amount of furfural may be recovered by periodically relieving the digester in which cooking is performed. The spent liquor may be one resulting from cooking in a solution of a salt, such as sodium monosulphite, as in such case, too, it contains pentoses, which may be converted into and recovered as furfural by a high temperature treatment in accordance with the present invention. Prior to such treatment, acid may be added to the liquor to neutralize it, if it is slightly alkaline, or to produce therein an acid condition in the event that the liquor is either alkaline or neutral.

I claim:

1. A process which comprises neutralizing spent acid sulphite liquors resulting from the digestion of wood, concentrating the neutralized liquor, acidifying the liquor, subjecting the acidified liquor to temperatures sufficiently high to vaporize the furfural generated therein, permitting the escape of vapor from such liquor while so heated, and condensing and recovering the furfural from such vapor.

2. A process which comprises cooking wood at elevated temperature in chemical liquor to produce pulp, separating the liquor while hot from the resulting pulp, subjecting the liquor in hot condition to temperatures sufficiently high to vaporize the furfural generated therein, permitting the escape of vapor from such liquor while so heated, and condensing and recovering the furfural from such vapor.

3. A process which comprises cooking hardwood of the character of birch, maple, beech, and the like at elevated temperature in chemical liquor to produce pulp, separating the liquor while hot from the resulting pulp, subjecting the liquor in hot and acid condition to temperatures sufficiently high to vaporize the furfural generated therein, permitting the escape of vapor from such liquor while so heated, and condensing and recovering the furfural from such vapor.

In testimony whereof I have affixed my signature.

GEORGE A. RICHTER.